(No Model.)

F. N. RUSSELL.
KNIFE SHARPENER.

No. 355,475. Patented Jan. 4, 1887.

Witnesses

Inventor
Frank N. Russell.
By his Attorney Chas. H. Fowler

UNITED STATES PATENT OFFICE.

FRANK N. RUSSELL, OF ELMIRA, NEW YORK.

KNIFE-SHARPENER.

SPECIFICATION forming part of Letters Patent No. 355,475, dated January 4, 1887.

Application filed October 23, 1886. Serial No. 217,048. (No model.)

*To all whom it may concern:*

Be it known that I, FRANK N. RUSSELL, a citizen of the United States, residing at Elmira, in the county of Chemung and State of New York, have invented certain new and useful Improvements in Knife-Sharpeners; and I do hereby declare that the following is a full, clear, and exact description of the same, reference being had to the annexed drawings, making a part of this specification, and to the letters and figures of reference marked thereon.

Figure 1:
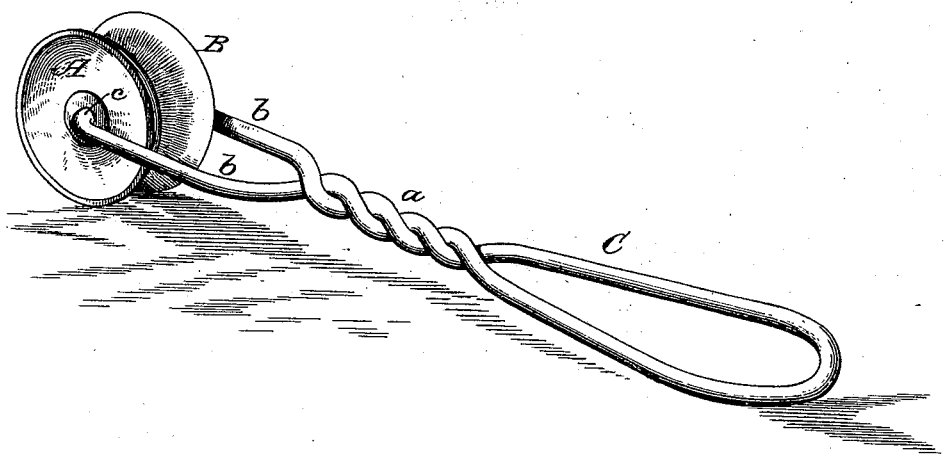
Figure 2:
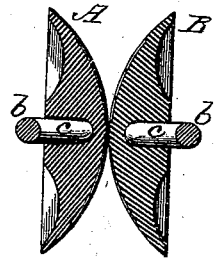

Figure 1 of the drawings is a perspective view of my improved knife-sharpener, and Fig. 2 a transverse section through the wheels or disks.

The object of the present invention is to provide a simple and cheap tool for use in the household for convenience in sharpening carving, bread, and other knives to keep them in good condition for use; and the invention consists in the details of construction, substantially as shown in the drawings, and hereinafter described and claimed.

In the accompanying drawings, A B represent two convex disks or wheels, their convex faces being opposite each other and having cut thereon a surface similar to that of a file, the convexity of the disks or wheels forming a guide for the blade of the knife when passed between them. The handle C of the tool and the portion to which the disks are connected are preferably formed of a single piece of wire twisted at *a*, to form the shank thereof, and terminating in arms *b*, bent inwardly at their extremities to form journals *c*, upon which are mounted the wheels or disks A B. The arms *b* have sufficient spring to keep the convex faces of the disks or wheels pressed against the sides of the knife-blade when drawn across them, thereby no skill being required to sharpen effectively.

It should be noticed that the convex disks are independent of each other, and not connected together, thus allowing the knife-blade to pass between them without danger of the cutting-edge coming in contact with the screw or other fastening which heretofore held the disks together by passing through them.

The wheels or disks are preferably formed of steel; but in place thereof solid emery wheels or disks may be used, or they may be constructed of wood or other material coated with emery; and in place of making the handle of a single piece of wire it may be constructed of one or more pieces, or the handle may be formed of wood or other material and the spring-arms connected thereto in any desirable manner, such modifications being made without departing from the spirit of my invention.

Having now fully described my invention, what I claim as new, and desire to secure by Letters Patent, is—

A knife-sharpener consisting of two convex disks or wheels having opposite convex faces and independently journaled upon spring-arms projecting from a suitable handle, substantially as and for the purpose set forth.

In testimony that I claim the above I have hereunto subscribed my name in the presence of two witnesses.

FRANK N. RUSSELL.

Witnesses:
J. F. VAN NOSH, Jr.,
JOHN BARTHOLOMEW.